H. W. TURNER.
DRYING OR BAKING STOVE OR OVEN.
APPLICATION FILED MAY 2, 1912.
1,045,915.
Patented Dec. 3, 1912.
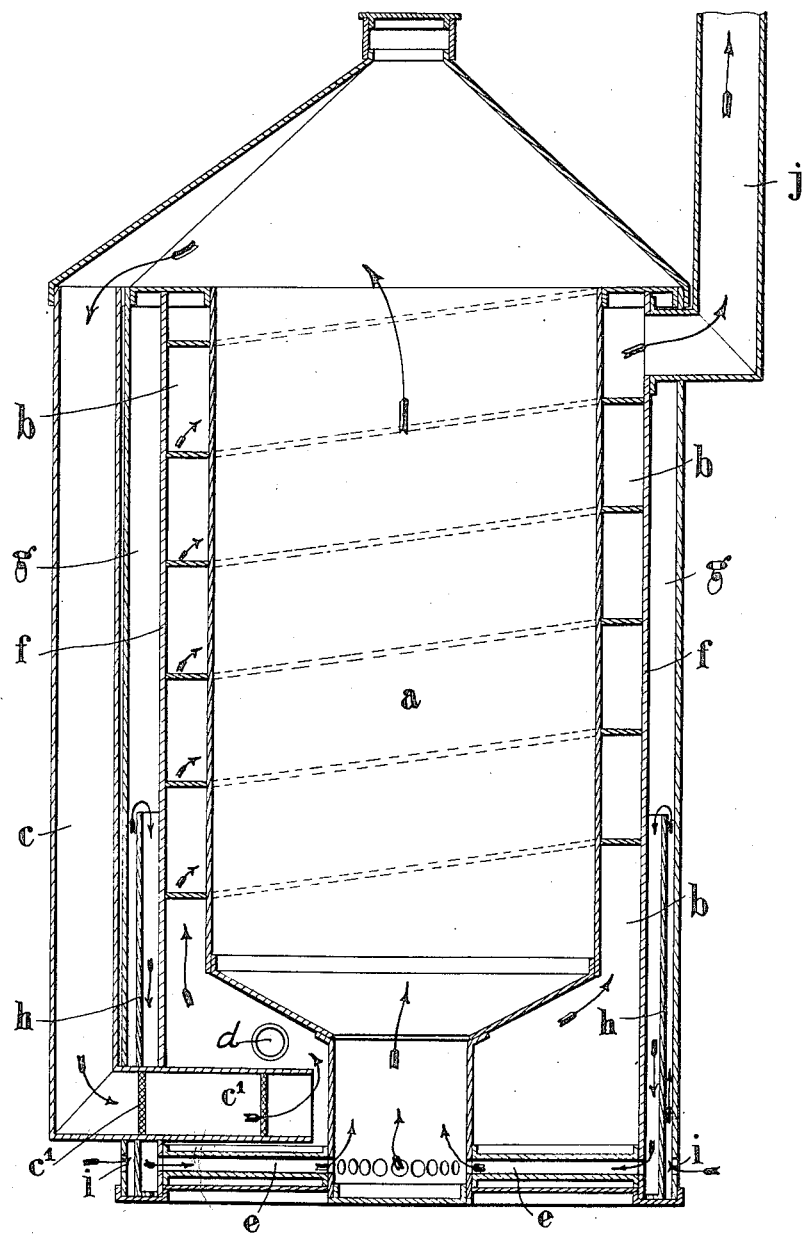
Witnesses.
Ewd L. Tolson
H. L. Alden
Inventor.
Harry W. Turner,
by Spear, Middleton, Donaldson & Spear
Attorneys.

UNITED STATES PATENT OFFICE.

HARRY WINTHROP TURNER, OF MANCHESTER, ENGLAND.

DRYING OR BAKING STOVE OR OVEN.

1,045,915. Specification of Letters Patent. Patented Dec. 3, 1912.

Application filed May 2, 1912. Serial No. 694,709.

*To all whom it may concern:*

Be it known that I, HARRY WINTHROP TURNER, a citizen of the United States, residing at Nutsford Vale Works, Pink Bank Lane, Longsight, Manchester, in the county of Lancaster, England, have invented certain new and useful Improvements in Drying or Baking Stoves or Ovens, of which the following is a specification.

This invention relates to drying or baking stoves or ovens and particularly to the apparatus employed in the drying of electrical insulation and for enameling and japanning purposes, its object being to provide a compact but efficient form of apparatus which is portable or capable of ready transport and is economical in use.

My invention comprises essentially the combination with a chamber in which the material to be dried is placed, of means causing the air which passes through said chamber for drying purposes and for carrying off the fumes or vapor generated, to subsequently enter the combustion chamber to assist in heating and to take part in the process of combustion whereby the said chamber is heated.

Referring to the accompanying explanatory drawing which is a sectional elevation of a stove constructed in one convenient form in accordance with my invention, I form the drying chamber $a$ of any convenient form, but preferably of an internal form resembling that of a cupola as used in the melting of iron. The top or cover of the drying chamber is detachable to permit of the insertion of the apparatus to be dried. The chamber may be made of sheet metal and is inclosed within a flue like annulus $b$ through which the hot products of combustion flow for heating the chamber. To provide for an efficient action of the hot products upon the latter, I may cause them to travel through said annulus in a spiral or circuitous path from the lower to the upper end of the apparatus. The air supply for combustion purposes is obtained from the interior of the chamber by way of a flue or conduit $c$ which leads from the upper end of the stove or oven to its lower end, the circulation of air being insured by the heating action of the gas jets or like means situated at $d$ causing the air in the drying chamber $a$ and the products of combustion and heated air within the combustion chamber $b$ respectively to rise, the air from the interior of the chamber $a$ flowing through the conduit $c$ to the combustion chamber $b$ to take the place of the products of combustion passing therefrom.

The air supplied to the interior of the drying chamber $a$ enters at its lower end by the space or chamber $e$ formed by the double bottom of the apparatus but is previously deprived of its moisture by being heated by contact with the hot plates $f$ forming the exterior wall of the annular flue $b$ aforesaid. In one convenient form, the air which provides the supply of oxygen for the oxidation process of drying the varnish is drawn into the apparatus through an inclosing chamber $g$ around the combustion chamber and annular flue, a suitable baffle plate $h$ being provided to cause the air to make a more or less extended period of contact with the hot plates $f$ in its passage from the apertures $i$ to the space $e$. The chamber $g$ also serves as a heat non-conducting chamber for preventing heat radiation from the apparatus. The warmed air gains access to the drying chamber $a$ by way of its perforated lower portion. After passing through said chamber, wherein it is heated, the air and any vapor or fumes which may be generated during the drying process, pass by way of the flue or conduit $c$ to the gas jets or like heating means $d$ in the combustion chamber and annular flue of the apparatus. One or more gauze or like screens $c^1$ are preferably provided in the conduit $c$ to prevent back firing. Hence the gases pass to the chimney or discharge pipe $j$ which may be of any convenient length.

By the arrangement of parts aforesaid, I provide for not only a continuous supply of fresh air or oxygen (from which all moisture or vapor has been eliminated) for insuring the hardening of the varnish or enamel, and for a very effectual ventilation of the drying chamber, but also for the utilization of the hot gases which may contain combustible vapor, in producing and maintaining a high temperature for drying purposes. I thus insure great economy and efficiency in working.

I may vary the details of my apparatus, including the shape and arrangement of the drying chamber, combustion chamber and air flues to suit any particular requirements.

My apparatus will be found very advantageous for use in drying or baking apparatus prior to varnishing or even when no varnishing is required.

Having now described my invention, what I claim as new, and desire to secure by Letters Patent is:—

1. In a drying or baking stove or oven, the combination of a drying chamber having fresh air inlets thereto, a combustion chamber for heating the walls of the drying chamber, a communicating conduit between the upper end of the drying chamber and the combustion chamber, and a chimney extending from the combustion chamber, the air circulating in series through the air inlets, the drying chamber, the communicating conduit, the combustion chamber and the chimney as set forth.

2. In drying or baking stoves or ovens, in combination, a drying chamber, a combustion chamber surrounding said drying chamber, a heat non-conducting chamber surrounding said combustion chamber, and means causing air to circulate in series through the heat non-conducting chamber wherein it is deprived of its moisture, through the drying chamber and then through the combustion chamber, as set forth.

3. In drying or baking stoves or ovens, in combination, a drying chamber, air inlets to said chamber at its lower end, a combustion chamber surrounding said drying chamber, means causing the products of combustion to take a circuitous course through said combustion chamber, means communicating between said drying and combustion chambers, a heat non-conducting chamber surrounding said combustion chamber and communicating with said drying chamber, and means preventing air taking a direct path through said heat non-conducting chamber, as set forth.

4. In drying or baking stoves or ovens, in combination, a drying chamber, a detachable cover for said chamber, a combustion chamber surrounding said drying chamber, means causing the products of combustion to take a circuitous path through said combustion chamber, a conduit establishing communication between said drying chamber and combustion chamber, a chimney, a heat non-conducting chamber surrounding said combustion chamber, air inlets to and outlets from said heat non-conducting chamber, means causing the air to take an extended path through said heat non-conducting chamber, and means communicating between the latter chamber and the lower end of the drying chamber, as set forth.

In testimony whereof I have signed my name to this specification in the presence of two subscribing witnesses.

HARRY WINTHROP TURNER.

Witnesses:
ARTHUR HUGHES,
HILDA HUGHES.